(12) United States Patent
Schneider

(10) Patent No.: US 9,552,146 B2
(45) Date of Patent: Jan. 24, 2017

(54) NOTCHED SLIDER CONTROL FOR A GRAPHICAL USER INTERFACE

(75) Inventor: Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 1673 days.

(21) Appl. No.: 12/168,644

(22) Filed: Jul. 7, 2008

(65) Prior Publication Data

US 2010/0005420 A1   Jan. 7, 2010

(51) Int. Cl.
*G06F 3/0484* (2013.01)
*G06F 3/0481* (2013.01)
*G06F 3/0485* (2013.01)

(52) U.S. Cl.
CPC ....... *G06F 3/04847* (2013.01); *G06F 3/04812* (2013.01); *G06F 3/0485* (2013.01)

(58) Field of Classification Search
CPC .. G06F 3/0485; G06F 3/0488; G06F 3/04847; G06F 3/04812
USPC .......... 715/833, 716, 784, 786, 772
See application file for complete search history.

(56) References Cited

U.S. PATENT DOCUMENTS

| | | | | |
|---|---|---|---|---|
| 5,581,275 A | * | 12/1996 | Glei et al. | 715/784 |
| 6,215,490 B1 | * | 4/2001 | Kaply | G06F 3/0481 715/788 |
| 6,778,192 B2 | * | 8/2004 | Arbab | G06F 3/04855 345/684 |
| 7,103,851 B1 | * | 9/2006 | Jaeger | 715/786 |
| 7,278,101 B1 | * | 10/2007 | Cassezza | 715/716 |
| 7,598,964 B2 | * | 10/2009 | Olson | H04N 1/6011 345/590 |
| 2005/0091604 A1 | * | 4/2005 | Davis | 715/772 |

OTHER PUBLICATIONS

Scrollscapes, Tjebbe Van Tijen ("Tijen"), Feb. 25, 2007, pp. 1-16.*
Tjebbe Van Tijen, Feb. 25, 2007, pp. 1-16.*

* cited by examiner

*Primary Examiner* — Sherrod Keaton
(74) *Attorney, Agent, or Firm* — George R. McGuire; Bond Schoeneck & King, PLLC; John Pivnichny

(57) ABSTRACT

A slide track of a notched slider control can include a continuous path extending between two end points. A slider can be a graphical element able to move along the slide track. The end points can correspond to upper and lower extremes of a value range. Positions between the end points can represent values within the value range. The slide track can include at least one notch that is visually represented within the slide control as a deviation from a straight line segment having the two end points. The notch corresponds to a value within the value range. The notch can causes the slider to become fixed at a point along the slide track whenever a pointing device controlling the slider is moved in a direction of the deviation.

14 Claims, 2 Drawing Sheets

NOTCHED SLIDER CONTROL FOR A GRAPHICAL USER INTERFACE

BACKGROUND OF THE INVENTION

The present invention relates to the field of graphical user interface controls, more particularly to notched slider control for a graphical user interface.

Numerous graphic user interface (GUI) controls exist to facilitate human-computer interactions. A majority of these GUI controls have a physical world analog, which makes the controls more intuitive for a user. For example, GUI controls include buttons, dials, sliders, and the like. One problem with current slider controls is that users can easily overshoot an intended value, which requires them to perform minute corrections until the value is perfectly matched to the user's intentions. Another annoyance is that fact that the slider user must also look at the value indictor, typically displayed proximate to the slider and configured to dynamically adjust when the slider is moved, to ensure that the desired value is being approached.

Users of GUI sliders can become frustrated with this need to constantly manipulate the slider control to place a slider in a desired position. This is particularly the case when users have a set of values along the slider continuum that are recurrently desired. Often desired values include a zero value, a middle value, and high value, although many others can be desired. Further, specific projects, applications, and/or users can have characteristic slider settings that are recurrently desired for that project, application, and/or user.

Some slider control variations exist that somewhat address the overshooting problem, each of which have a number of drawbacks. One variation is to create a slider with a middle-point that absorbs more "slide" than other positions, which allows users to more easily select a middle position, which is an often desired value. This biasing of a value along a slider continuum can be confusing to users and can be frustrating when a point proximate to the center, yet which is not the center, is desired. Biasing a slider often results in slider controls performing in a manner that is non-intuitive from a user perspective.

Another variation imposes graduations on a slider control, and slide actions of the controller snap to these preset graduations. This solution sacrifices one of the beneficial aspects of a slider control (an ability to use the slide position to reflect a user selectable point along a continuum) in order to simplify a selection of graduation associated values.

Still another solution permits a slider of a slider control to be clicked or double-clicked, which automatically adjusts the slider to a preset position. This solution suffers from being non-intuitive for many users and by being localized to a single value. Adding a "cycle" of presets achieved by clicking can increase a number of presets that can be navigated to, yet can also dramatically increase user confusion.

DETAILED DESCRIPTION OF THE INVENTION

Figure 1:
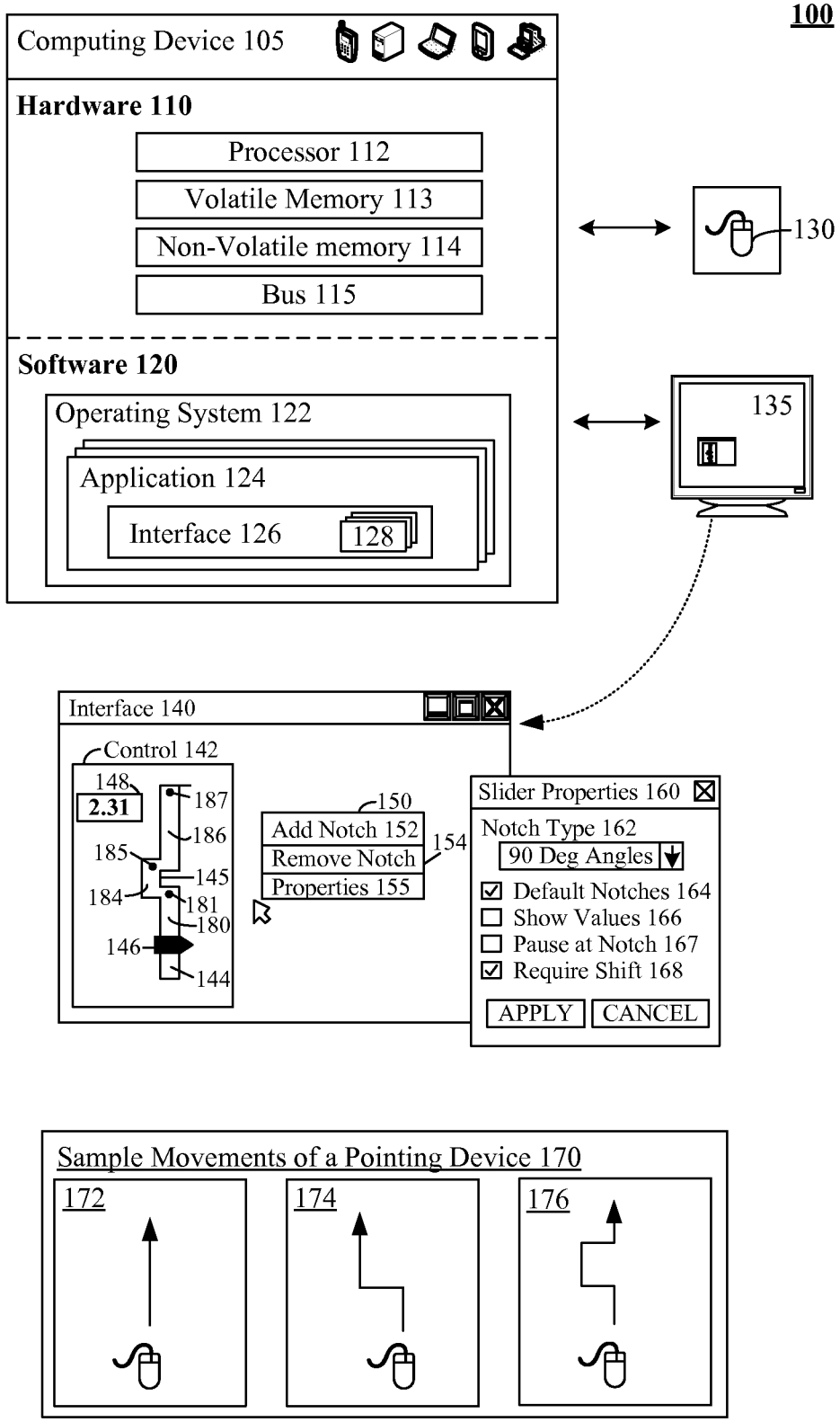
FIG. 1 is a schematic diagram illustrating a system that implements a notch slider control within a graphical user interface in accordance with an embodiment of the inventive arrangements disclosed herein.

The present invention implements notched slider controls within a graphical user interface. The notches permit a slider of the slider control to easily be moved to a notch point without overshoot. Use of notches with a slider is intuitive, as it is analogous to many physical analogs, such as a notched gear shifter in many automatic vehicles. Similarity to a known physical analog increases user acceptance, and control use intuitiveness. Additionally, values at notch points are easy to visually spot and comprehend. The notches eliminates the overshoot problem typical of slider controls, while still permitting a user to position a slider of the control at any point along a continuum of values. In one embodiment, the notch points can be user configured, which can visually alter the GUI slider control as well as adjust the values achieved at the notch points.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that implements a notch slider control 142 within a graphical user interface in accordance with an embodiment of the inventive arrangements disclosed herein. System 100 shows a computing device 105 having a pointer control peripheral 130 and a visual display 135. The computing device 105 can include hardware 110 and software 120. Firmware (not shown) is also contemplated for device 110, which is an alternative embodiment for implementing any computer program products and program artifacts, such as those 122-128 illustrated as being implemented within software 120.

The hardware 110 can include a processor 112, a volatile memory 113, and a nonvolatile memory 114, which are interconnected by a bus 115. The software 120 can be digitally encoded on the non-volatile memory 114, which is the case for client-side software executables. The software 120 can also be served from one or more remote locations, such as with Web services, in which case the software 120 may be placed within the volatile memory 113 during execution and may be absent from the non-volatile memory 114.

Regardless, the software 120 can include an operating system 122, and one or more applications 124. The applications 124 can include a graphical user interface (GUI) 126, which in turn includes one or more interactive controls 128. The GUI 126 and GUI ones of the controls 128 can be visually presented upon display 135. The computing device 110 can include additional components, peripherals, and interface types (e.g., voice user interfaces, multimodal interfaces, etc.), which are not elaborated upon due to the focus of system 100, which is for a novel GUI control.

More specifically, the novel GUI control is a notched slider control 142, an example of which is shown in interface 140. The notched slider control 142 is a modification of a standard slider control, which includes one or more notches along the slide track, along which the slider 146 travels. The notched slider control 142 can include an optional slide value 148 with displays a dynamically changeable value representing a current value associated with a current slider 146 position along the slide track 144. Unlike conventional slider controls, which are straight, the notched slider control 142 includes one or more deviations, such as a notch 145, from a reference direction (as shown the reference direction is vertical). Each notch 145 along the slide track 144 is associated with a value, which is optionally presented in the interface 140. A notch 150 is defined herein as any deviation along a reference direction of the slide track 144 (i.e., a deviation from straight).

The notch(s) 145 in the slide track 144 make it easy for a user to adjust the slider 146 to a value associated with the notch 145 with minimal risk of "overshooting" a desired value. Sample peripheral movements 170 are shown to illustrate this property of the notched slider control 142. Assume for this example, that the slider 146 at the bottom segment 180 of the slide track 144. When a user moves a mouse or other pointer controller in a straight upward direction, as shown by movement 172, the slider 146 is caught at the first notch in the slide track 144, which results in the slider 146 being positioned at point 181. Thus, even if the upward movement 172 is greater than necessary to move the slider 146 to point 181, the additional movements do not result in an overshooting of point 181. When a user desires to move the slider 146 from a bottom position of segment 180 to a top position 185 of segment 184, an upwards-left-upwards movement 174 is required. When a user desires to move the slider 146 along the slide track 144 from a bottom position of segment 180 to a top position 187 of segment 186, an upwards-left-upwards-right-upwards movement 176 is required. The movements 170 can vary based upon slide track 144 configuration, which can vary from embodiment to embodiment.

In one embodiment, the notch slider control 142 can be used user configured. For example, a pop-up window 150 can be presented when a user right-clicks on the slider control 142. The pop-up window 150 can include an option to add a notch 152, which will cause an additional deviation or notch to be added to the slide track 144 at a user designated point. A remove notch option 154 can permit a user to select an existing notch 145 of the slider control 142 and remove it.

In another example, a slider properties window 160 can be presented to a user, such as after a properties option 155 is selected. The configuration window 160 can permit a user to select a type of notch 162 for the slider control 142, such as a ninety degree notch, a zigzag notch, a curved bump notch, a grooved notch, and the like. A set of default notch points/values 164 can be included, which can be selectively enabled or disabled. For instance, default notches 164 can be positioned at the one quarter, at the one half, and the three quarters slide track 144 positions. An option to show or hide values 166 proximate to the notches of the slide track 144 can be enabled/disabled. The values of the notches can be always present or can be selectively shown, such as within a popup when a user hovers a pointer over a notch 145.

The properties window 160 can also include behavioral settings, such as automatically pausing at a notch 167 or not. In one embodiment, during a pause, the slider 146 can travel horizontally along a "notch" to shift from one track segment to another. For instance, when option 167 is enabled, the slider 146 of a vertically oriented slide track 144 can slide along horizontal portions of the slide track 144 after a designated delay (e.g., two seconds). For example, the slider 146 can travel leftward from a point 181, until it is vertically aligned with point 185. A different behavioral option can require a pointer to shift 168, which requires a motion along a notch 145 to be emulated by a pointing device, as shown in movement examples 174 and 176.

As used herein, computing device 105 can include any computing device which permits user interaction through a graphical user interface 126. In one embodiment, the graphical user interface 126 can be a visual mode of a multi-modal user interface. The computing device 105 can include, but is not limited to, a personal computer, a mobile phone, a media player, an electronic gaming console, a consumer electronic device, a wearable computer, a navigation device, a personal data assistant, a kiosk, an embedded computing system, and the like.

The pointer control peripheral 130 can include any of a variety of devices able to accept input to move a pointer within a graphical user interface in a user designated manner. The pointer control peripheral can include, for example, a mouse, a trackball, a pointing stick, a touchpad, a joystick, a set of position specific buttons, and the like.

The display 135 can include any component or device able to visually present a graphical user interface. The display 135 can include a monitor, an embedded screen, a video projector, a holographic projector, and the like.

Figure 2:
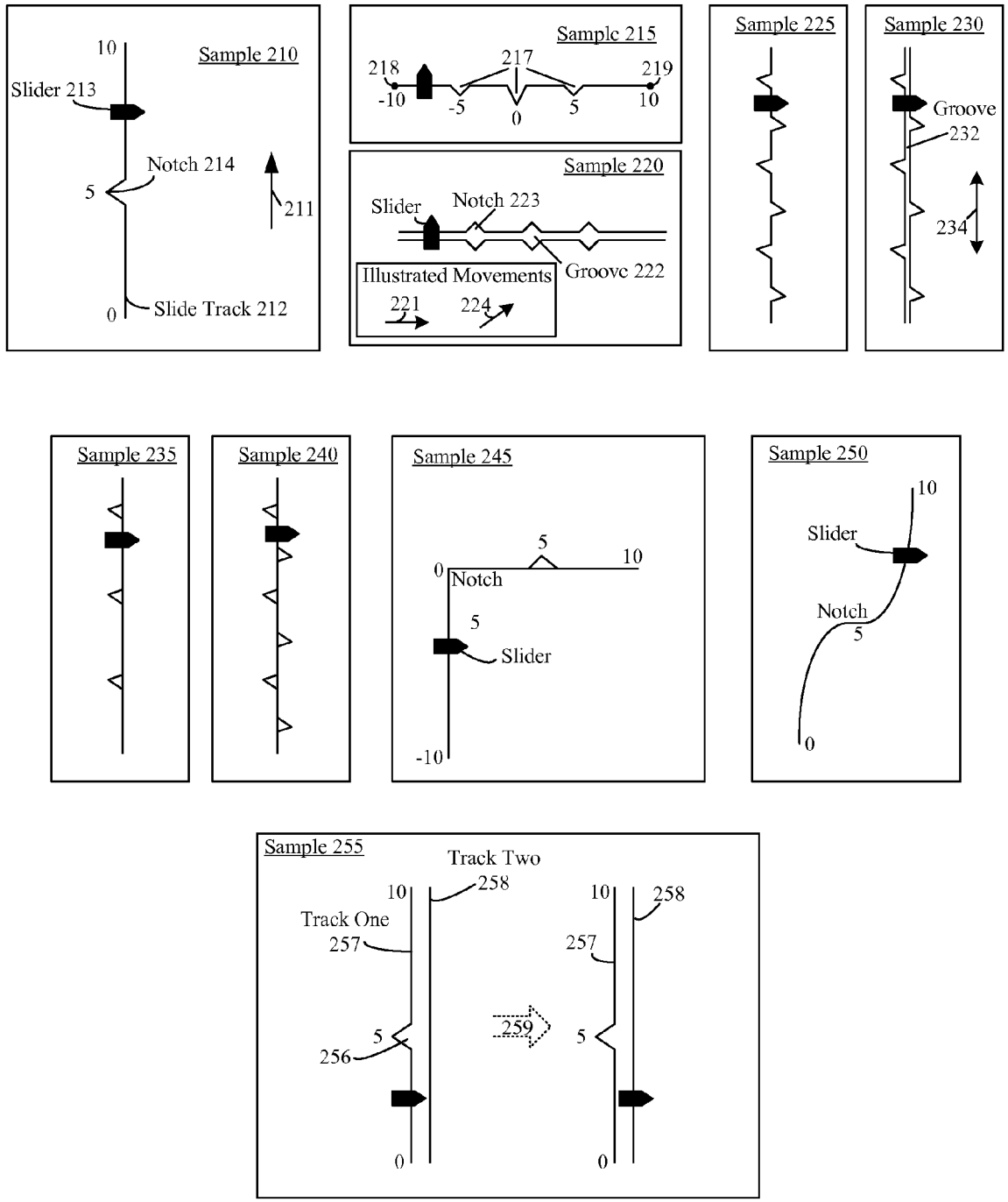
FIG. 2 shows a variety of slide tracks and associated notches able to be used for a notch slider control in accordance with embodiments of the inventive arrangements presented herein.

FIG. 2 shows a variety of samples 210, 215, 220, 225, 230, 235, 240, 245, 250, 255 slide control configurations able to be used in accordance with embodiments of the inventive arrangements presented herein. The control samples 210, 215, 220, 225, 230, 235, 240, 245, 250, 255 can be implemented in context of the slider control 142 of system 100. It should be understood that the illustrated samples 210, 215, 220, 225, 230, 235, 240, 245, 250, 255 are presented to demonstrate a selection of possible configurations for a notched slider control and that these sample 210, 215, 220, 225, 230, 235, 240, 245, 250, 255 are not intended to be exhaustive. Any slider control having a notch (e.g., a deviation from straight) should be considered within the scope of present invention.

Sample 210 illustrates a brace design in a vertical position (relative to a reference direction 211 that indicates a direction of travel off the slider 213), where the slide track 212 is substantially straight. At least one discrete notch 214 can be positioned between the upper and lower endpoint of the track 212. Additional notches can optionally be added to track 212. These additional notches can include preset and user established notches.

Sample 215 illustrates a horizontal slide track with three notches 217 between the endpoints 218 and 219. As shown in sample 215, the notches 217 are not necessarily of uniform size, where differences in size represent a stronger "bias" toward a given point. That is, the varying lengths of the notches 217 convey additional semantics to a user regarding notch 217 behavior. For example, the middle notch 217 can represent a larger "bump" of the slide track where a slider sticks for longer/more prominently at this middle, larger notch compared to the other two notches 217. This can be useful when the middle notch 217 represents a more often used setting relative to the "lesser" notches 217. In one contemplated embodiment, notched slider control can be configured to dynamically adjust with use, so that more often used points become associated with more pronounced notches than lesser used ones.

Sample 220 represents a parallel notched track, where notched values on both sides of the track are equal. The parallel tracks for a groove 222 along which the slider travels. Here, a user can move a slider freely down the central portion of the slide track, but can move a pointing device to either side of the track to "lock" the slider to a notched value without a substantial risk of overshooting a value associated with a notched point. For example, when the slider is positioned as shown, and the pointing device is moved in direction 221, the slider can freely move horizontally along the slide track. When the pointing device is moved in direction 224 (NE direction), the slider will stop at notch 223.

Sample 225 represents a notched slider control, where the slide track includes notches on either side of the track, which is otherwise substantially straight. This arrangement can be particularly advantageous in many situations, as it can be easy to move from one preset "notch" to another using a zigzag motion of a pointing device without overshooting desired values.

Sample 230 shows a notched slide control that adds a center groove 232 to the slide track, which can provide freer motion to the last position (by movements of a pointing device along a center of the groove 232), while permitting a user to make quick jumps to notched points by deviating a pointing device motion from the reference direction 234. For example, motions leftwards (West) of the reference direction 234 will tend to make the slider "stick" on left hand side notches and motions rightwards (East) of the reference direction 234 will tend to make the slider "stick" to right hand side notches.

Sample 235 represents a notched slide control having a slide track lacking a central groove, yet still having a track center through which the slider can freely move. Behavior of sample 235 is approximately equivalent to that of sample 220, except that notches are present only upon one side of the slide track.

Sample 240 represents a notched slide control having a slide track with a zigzag pattern and a central line. Along the center line, free movement of the slider is possible. Movement angles towards notch points cause the slider to "stick" at a notch to prevent overshooting of notch point values.

Sample 245 represents a notched slide control having a non-straight slide track, where a continuous motion along a slide track includes a ninety degree deviation. This deviation in the track 245 itself can be considered a notch for purposes of the disclosed invention. As shown, the ninety degree angle is at a zero value, where the track segment downward from the zero value represents a continuum of values from zero to negative ten. The track segment from the zero value to right represents a continuum of values from zero to positive ten. Each track segment can optionally include other notches, such as the notch shown for the value positive five. In one embodiment, the slider positioning can automatically adjust for a different origination; depending upon which track segment it is positioned.

Sample 250 represents a notched slide control having a curved slide track (where the curve is a notch). The angle at the curve can be altered depending upon the prominence of the notch. In one embodiment, the curve can be biased so that an area about the notched value evaluates at a particular value, such as a value of five as shown on the sample 250.

Sample 255 represents a notched slide control having dual slide tracks 257, 258, where the slider can be moved (horizontally slide) from one track to the other. For example, the track one 257 can be a notched track having a notch 256 at a value of five. A horizontal slide 259 of the slider can result in the slider being positioned on track two 258, along which the slider can freely move without encountering a notch.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing device comprising a processor, a memory, and a display, wherein the display comprises a graphical user interface (GUI) slider control of a graphical user interface of the computing device, said graphical user interface comprising:

a slide track of the slider control comprising a continuous path extending between two end points, wherein a lower one of the two end points corresponds to a lower extreme of a value range, an upper one of the two end points corresponds to an upper extreme of the value range, and positions between the lower end point and the upper end point represent values within the value range, wherein said slide track is visually presented within the graphical user interface and comprises a plurality of notches, wherein at least two of said plurality of notches are positioned on opposing sides of the slide track, and each notch corresponds to at least two notch points each associated with a unique value within the value range, each notch visually represented as a series of four 90 degree turns in the slide track of the slider control;

a slider configured as a user selectable graphical element able to move along the slide track, wherein the notch causes the slider moving along the slide track to become fixed at a first notch point associated with the first 90 degree turn of the notch, wherein the first notch point of the notch is associated with a first value within the value range, and further wherein the notch causes the slider moving further along the slide track to become fixed at a second notch point associated with the third 90 degree turn of the notch, wherein the second notch point of the notch is associated with a second value within the value range, wherein the second value is greater than the first value;

a value indicator configured to visually present a current value based upon the slider position, wherein the current value presented within the value indicator is configured to dynamically adjust as the slider is moved; and wherein said slide track is configured to permit movement of the slider responsive to approximately straight line movement of a pointing device along a reference direction from one of the two end points to the other that is unaffected by a notch, wherein said slide track is configured to impede motion of the slider responsive to approximately straight line movement of the pointing device that deviates from the reference direction and follows, wherein the impeding of motion follows the angle of and corresponds to a position of the slider at a notch.

2. The GUI slide control of claim 1, further comprising:
an interactive GUI element configured to accept user input, wherein said user input is able to effect a change in at least one of a placement and existence of at least one notch along the slide track.

3. The GUI slide control of claim 2, wherein the interactive GUI element is configured to permit a user to add a notch to the slide track that corresponds to a user designated value within the value range.

4. The GUI slide control of claim 2, wherein the interactive GUI element is configured to permit a user to remove a user selected notch from the slide track.

5. The GUI slide control of claim 1, further comprising:
a visual value indicator proximate to each notch, wherein said visual value indicator visually shows a value associated with said notch.

6. The GUI slide control of claim 1, wherein said track comprises two continuous lines that are approximately parallel to each other that form a groove along which the slider moves, wherein said approximately parallel positioning of the two continuous lines selectively deviates from each other at positions corresponding to the notch.

7. A method for preventing value overshooting for a slider control comprising:
visually presenting a slide track comprising a continuous path extending between two end points, wherein a lower one of the two end points corresponds to a lower extreme of a value range, an upper one of the two end points corresponds to an upper extreme of the value range, and positions between the lower end point and the upper end point represent values within the value range, wherein said slide track comprises a plurality of notches, wherein at least two of said plurality of notches are positioned on opposing sides of the slide track, and each notch corresponds to at least two notch points each associated with a unique value within the value range, each notch visually represented as a series of four 90 degree turns in the slide track of the slider control;
visually presenting a slider configured as a user selectable graphical element able to move along the slide track, wherein the notch causes the slider moving along the slide track to become fixed at a first notch point associated with the first 90 degree turn of the notch, wherein the first notch point of the notch is associated with a first value within the value range, and further wherein the notch causes the slider moving further along the slide track to become fixed at a second notch point associated with the third 90 degree turn of the notch, wherein the second notch point of the notch is associated with a second value within the value range, wherein the second value is greater than the first value;
receiving directional input from the pointing device;
impeding movement of the slider responsive to the received directional input at one of the first and second notch points to facilitate a selection of the value along the value range that correspond to the notch; and configuring said slide track to permit movement of the slider responsive to approximately straight line movement of a pointing device along a reference direction from one of the two end points to the other that is unaffected by a notch, wherein said slide track is configured to impede motion of the slider responsive to approximately straight line movement of the pointing device that deviates from the reference direction and follows, wherein the impeding of motion follows the angle of and corresponds to a position of the slider at a notch.

8. The method of claim 7, wherein the notch is visually presented as a deviation from a straight line connecting the two end points of the slide track, wherein directional input corresponding to a straight line motion in a direction corresponding to the slide track end points is configured to halt the slider at the notch.

9. The method of claim 7, further comprising:
visually presenting an indicator of the value corresponding to the notch within the user interface to apprise a user of a value achieved when the slider is positioned at the notch.

10. The method of claim 7, further comprising:
providing an interactive GUI element configured to accept user input, where said user input is able to effect a change in at least one of a placement and existence of at least one notch along the slide track.

11. A computer program product for preventing value overshooting for a slider control, the computer program product comprising:
a non-transitory computer usable storage medium having computer usable program code embodied therewith, the computer usable program code comprising:
computer usable program code configured to visually present a slide track comprising a continuous path extending between two end points, wherein a lower one of the two end points corresponds to a lower extreme of a value range, an upper one of the two end points corresponds to an upper extreme of the value range, and positions between the lower end point and the upper end point represent values within the value range, wherein said slide track comprises a plurality of notches, wherein at least two of said plurality of notches are positioned on opposing sides of the slide track, and each notch corresponds to at least two notch points each associated with a unique value within the value range, each notch visually represented as a series of four 90 degree turns in the slide track of the slider control;
computer usable program code configured to visually present a slider configured as a user selectable graphical element able to move along the slide track, wherein the notch causes the slider moving along the slide track to become fixed at a first notch point associated with the first 90 degree turn of the notch, wherein the first notch point of the notch is associated with a first value within the value range, and further wherein the notch causes the slider moving further along the slide track to become fixed at a second notch point associated with the third 90 degree turn of the notch, wherein the second notch point of the notch is associated with a second value within the value range, wherein the second value is greater than the first value;
computer usable program code configured to receive directional input from the pointing device; and
computer usable program code configured to impede movement of the slider responsive to the received directional input at one of the first and second notch points to facilitate a selection of the value along the value range that corresponds to the notch; and wherein said slide track is configured by computer usable program code to permit movement of the slider responsive to approximately straight line movement of a pointing device along a reference direction from one of the two end points to the other that is unaffected by a notch, wherein said slide track is configured to impede motion of the slider responsive to approximately straight line movement of the pointing device that deviates from the reference direction and follows, wherein the impeding of motion follows the angle of and corresponds to a position of the slider at a notch.

12. The computer program product of claim 11, wherein the notch is visually presented as a deviation from a straight line connecting the two end points of the slide track, wherein directional input corresponding to a straight line motion in a direction corresponding to the slide track end points is configured to halt the slider at the notch.

13. The computer program product of claim 11, further comprising:

computer usable program code configured to visually present an indicator of the value corresponding to the notch within the user interface to apprise a user of a value achieved when the slider is positioned at the notch.

14. The computer program product of claim 11, further comprising:

computer usable program code configured to provide an interactive GUI element configured to accept user input, where said user input is able to effect a change in at least one of a placement and existence of at least one notch along the slide track.

* * * * *